Dec. 11, 1934.                R. E. BECHTOLD                1,984,328
                              VALVE STRUCTURE
                             Filed Sept. 6, 1932

Ruben E. Bechtold INVENTOR
BY
H. G. Burns ATTORNEY

Patented Dec. 11, 1934

1,984,328

UNITED STATES PATENT OFFICE 1,984,328

VALVE STRUCTURE

Reuben E. Bechtold, Fort Wayne, Ind., assignor to Tokheim Oil Tank and Pump Company, a corporation of Indiana Application September 6, 1932, Serial No. 631,825

2 Claims. (Cl. 251—144)

This invention relates to improvements in valve structures, particularly a check valve adapted for installation in a pipe line that is easily accessible for repair or renewal purposes.

One of the objects of the invention is to provide in conjunction with a pipe connection a check-valve structure and means for removably securing it in the connection in such manner as to obviate distortion of the valve seat or disturbing alinement of the valve with the seat. Other objects and advantages of the invention will appear in the following description.

An illustrative embodiment of the invention is shown in the accompanying drawing, in which:—

Figure 1:
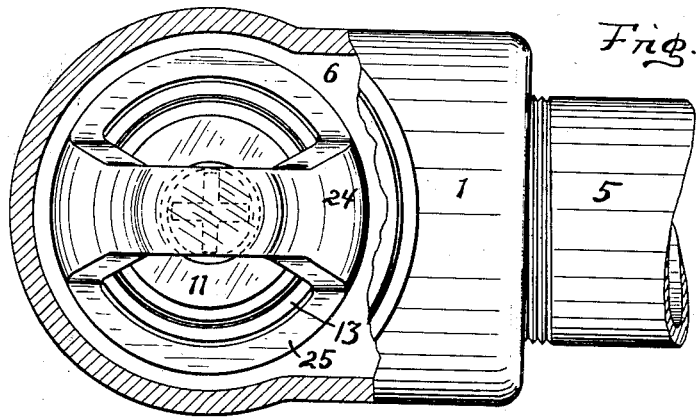
Figure 2:
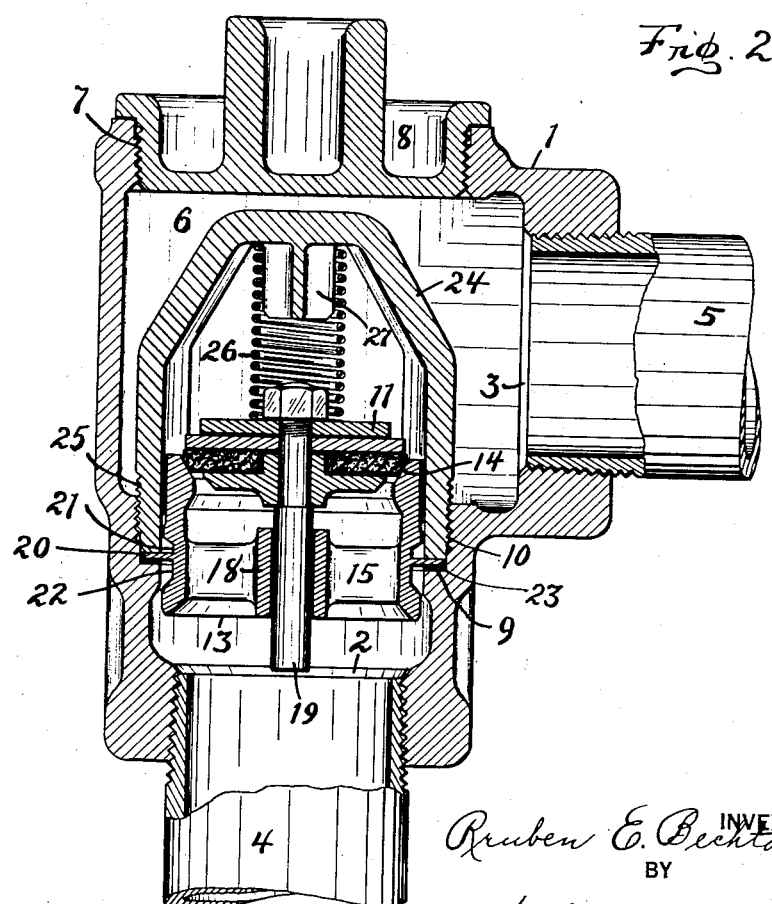

Fig. 1 is a plan view of a structure in which the invention is embodied, a portion being broken away; and Fig. 2 is a vertical section projected from Fig. 1.

The invention as illustrated in the drawing consists of a hollow pipe connection 1, preferably of the T-type having threaded openings 2 and 3 in which are secured corresponding pipes 4 and 5 in the usual manner so that said pipes and the connection form a continuous suction or flow line in which is provided a valve chamber 6 in the connection.

The top of the connection 1 has therein a threaded hand-hole 7 through which communication is had to the chamber 6 and which is normally closed by a removable plug 8. The inner wall of the lower portion of the connection 1 is so formed as to afford an annular gasket seat 9 facing upwardly, and that portion of said inner wall above and adjacent to the gasket seat is threaded as indicated at 10.

Within the chamber 6 is disposed an upflow check valve 11 and its complemental supporting sleeve 13 provided with a valve seat 14 upon which the valve normally rests and closes the opening through the sleeve. The lower portion of the sleeve has therein a spider 15 in the hub 18 of which the stem 19 of the valve has axial sliding guided movement. The sleeve 13 has a thin external annular fin 20 and has also annular gains 21 and 22 made in the outer wall of the sleeve respectively at points adjacent the top and bottom faces of the fin so as to permit more or less flexure of said fin without springing or distorting the sleeve when force is applied to the fin.

A gasket 23 is disposed upon the seat 9 in the connection 1 and the sleeve 13 is posed so that the outer marginal portion of its fin 20 rests upon the gasket where it is securely held in place by means of a yoke 24 which is provided with an externally threaded integral ring 25 that engages the threads 10 in the connection. Thus, when the yoke is screwed into place the fin 20 is securely clamped upon the gasket and the sleeve is thereby held suspended in operative position within the chamber 6.

Preferably, the fin 20 is located on that portion of the sleeve that encompasses the spider 15 so that any stress placed upon the sleeve by the fin when clamped in place is resisted by the spider because of the support afforded thereby to the adjacent wall of the sleeve. The fin is of sufficient thinness, and projects from the wall of the sleeve such substantial distance therefrom that its inner marginal portion lies clear of the gasket 23 and clamping ring 25, and bends to accommodate itself to such irregularities in the clamping surface of said ring and gasket or variations in the thickness or consistency of the gasket as may occur in the manufacturing operations, without imparting undue stress upon the sleeve. This is essential in securing the sleeve in operative position as thereby is circumvented distortion of the sleeve and consequent springing of its valve-seat out of true. In this manner is assured proper and accurate seating of the valve.

The valve 11 is yieldingly held in closed position by means of a compression spring 26 the ends of which bear respectively against the valve and the yoke, there being a pendent guide post 27 on the yoke which holds the spring in proper alinement with the valve.

The invention is useful in suction or flow lines and particularly where an accurately seating check valve is required, and is also desirable when that part of the line in which the check-valve is located is installed underground. When it is discovered that the valve has become defective through wear or fails to function properly, the valve may be renewed by first exposing the upper end of the connection 1 and removing the plug 8 therefrom, whereupon, access is had to the chamber 6 so that the yoke, spring and the valve with its complemental sleeve may readily be removed and replaced. In this manner renewal or repairs of the valve and the sleeve is accomplished without disturbing the joints between the connection and associated pipes.

I claim:

1. A valve structure consisting of a chambered pipe connection having pipe openings and a hand-hole opposite and alined with one of said openings, and provided with an internal annular gasket seat, a plug for closing said hand-hole, a gasket on said seat, a sleeve having a valve seat and a thin uniformly shaped annular fin extending radially from its outer wall that rests on said gasket and suspends said sleeve in the chamber of said connection, a yoke having an integral ring threaded in said pipe connection to clamp said fin in place therein, a check-valve on said valve seat, and a compression spring compressed between the yoke and valve.

2. A valve structure consisting of a chambered pipe connection having pipe openings and hand-hole opposite and alined with one of said openings, and provided with an internal annular seat, a plug for closing said hand-hole, a sleeve having a thin uniformly shaped annular fin extending radially from its outer wall that rests on said seat and suspends said sleeve in the chamber of said connection, a yoke having an integral ring threaded in said connection securing said fin on said seat, a check-valve operatively associated with said sleeve normally closing the opening therethrough, and a spring compressed between said yoke and valve tending to hold said valve in closed position.

REUBEN E. BECHTOLD.